United States Patent [19]

Krude

[11] 4,019,347
[45] Apr. 26, 1977

[54] BALL GROOVES FOR A CONSTANT VELOCITY UNIVERSAL JOINT

[75] Inventor: Werner Krude, Neunkirchen, Germany

[73] Assignee: Lohr & Bromkamp GmbH, Offenbach am Main, Germany

[22] Filed: July 11, 1975

[21] Appl. No.: 595,089

[30] Foreign Application Priority Data

July 11, 1974 Germany .......................... 2433349

[52] U.S. Cl. ......................................... 64/21; 64/8
[51] Int. Cl.² .......................................... F16D 3/30
[58] Field of Search ..................................... 64/21, 8
[56] References Cited
UNITED STATES PATENTS

| 2,653,456 | 8/1953 | Aeym | 64/21 |
| 2,838,919 | 6/1958 | Cull | 64/21 |
| 3,076,323 | 2/1963 | Aucktor | 64/21 |
| 3,475,924 | 11/1969 | Aucktor | 64/21 |

Primary Examiner—Samuel Scott
Assistant Examiner—Randall Heald
Attorney, Agent, or Firm—Edmund M. Jaskiewicz

[57] ABSTRACT

A constant velocity universal joint comprises an outer joint member with a hollow interior and grooves formed in the interior surface thereof. An inner joint member is within the outer joint member and has a plurality of grooves in its outer surface such that a groove of the outer member and a groove of the inner member jointly receive a ball which contacts a surface of each groove at one point under a torque load. A cage is disposed between the joint members and has a plurality of radial openings to retain the balls therein. Each of the grooves is constructed with a surface to provide a further point of contact by the balls under all bending angles of the joint and under torque load.

3 Claims, 9 Drawing Figures

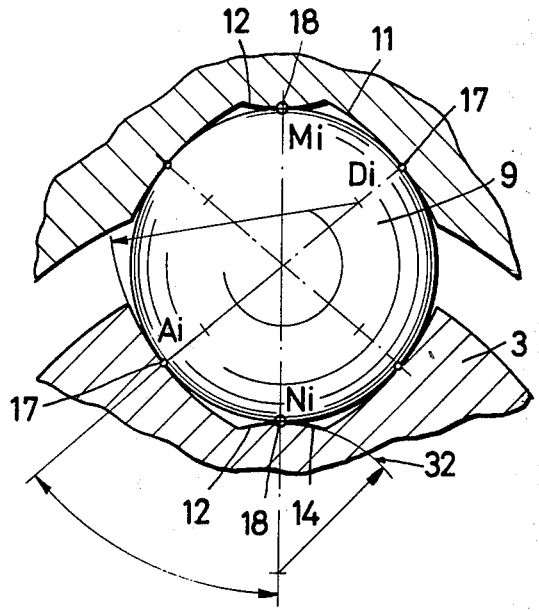
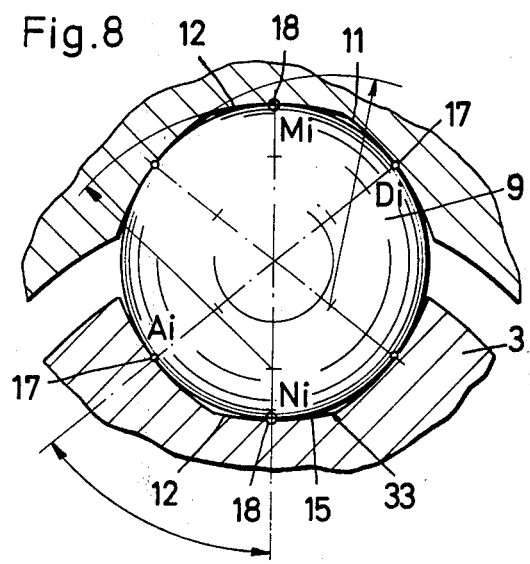

BALL GROOVES FOR A CONSTANT VELOCITY UNIVERSAL JOINT

The present invention relates to constant velocity universal joints, more particularly, to the ball grooves of the inner and outer joint members in which the balls for transmitting torque are jointly received.

One form of a constant velocity universal joint comprises an outer joint member having a hollow interior on the walls of which are formed grooves and an inner joint member is disposed within the outer joint member and similarly has its outer surface provided with a plurality of grooves correspondng in number to the grooves in the outer joint member. The grooves may be circular, eliptical or gothic in section and are generally oppositely disposed from each other such that an outer member groove and an inner member groove jointly accomodate a ball which contacts the surface of each groove at one point under a torque load. A cage is positioned between the joint members and is provided with a plurality of openings for retaining the balls therein.

One disadvantage of this form of universal joint as described above is that there is only a single point of contact under torque load between a ball and a groove at which transmission and passive focres are effected. Transmission forces may be defined as those forces which transmit torque through the inner joint member, the torque transmitting balls and the outer joint member. Between the inner and outer joint members extending through the contact points between the ball and the track grooves, the transmission forces form a three-dimensional or spatial angle the resultant force of which acts axially on the ball. The magnitude of this angle depends upon the bending angle of the joint, the rotary position of the joint and the type of the joint.

Passive forces may be defined as those forces which prevent axial sliding of the inner or outer joint members when the joint is aligned in its straight, unbent position and, depending upon the type of the joint, these forces also prevent the cage from being moved out of position when the joint is bent. The passive forces work in a direction opposite to that of the direction of the transmission forces. In those joints having the conventional sectional shapes for the track grooves these passsive forces are supported only by the cage which redirects these forces to the contact points of the individual torque transmitting balls which at that particualar time are under less of the operating or torque load, depending on the angle of rotation. As a result, the individal torque transmitting balls are subjected to relatively different loads and stresses and as a result the operating life of the joint is decreased.

It is therefore the principal object of the present invention to provide a novel and improved constant velocity universal joint having reduced operating loads and stresses for the cage and torque transmitting balls.

It is another object of the present invention to provide such a universal joint wherein at least a portion of the passive forces depending on the rotational angular position of the joint are absorbed to increase the useful operating life of the joint as a whole.

According to one aspect of the present invention there is provided a constant velocity universal joint which may comprise an outer joint member having a hollow interior and a plurality of grooves in the interior surface thereof. An inner joint member is disposed within the outer joint member and has a corresponding plurality of grooves in its outer surface. The inner and outer joint member grooves are opposed from each other to define pairs of opposed grooves and a ball is received in each pair of opposed grooves so as to contact a surface of each of said grooves at one point under a torque load. A cage is between the joint members and has a plurality of radial openings to retain the balls therein. The configuration or cross-sectional shape of the grooves is such so as to provide a further contact point for the balls under all bending angles of the joint and under torque load.

Other objects and advantages of the present invention will be apparent upon reference to the accompanying description when taken in conjunction with the following drawings, which are exemplary, wherein:

FIGS. 6, 7 and 8 are views similar to that of FIGS. 3-5 but showing the shapes of the ball grooves in accordance with the present invention.

Proceeding next to the drawings wherein like reference symbols indicate the same parts throughout the various views, a specific embodiment and modifications of the present invention will be described in detail.

Figure 1:
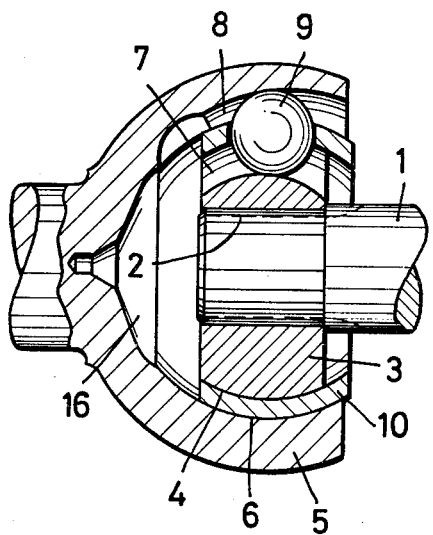
FIG. 1 is a longitudinal sectional view through a constant velocity universal joint of the type in which the present invention may be incorporated.
Figure 2:
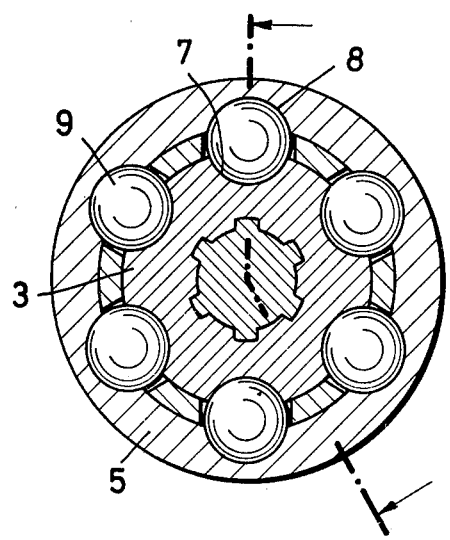
FIG. 2 is a transverse sectional view through the universal joint of FIG. 1.

In FIGS. 1 and 2 ther is illustrated a constant velocity universal joint of the non-sliding type which comprises an outer joint member 5 having a hollow interior in the form of a spherical cavity 16 having a spherical surface 6. A plurality of axially extending circumferentially spaced ball grooves 8 are formed in the inner wall of the interior space 16. An inner joint member 3 is positioned within the interior space 16 and has a spherical outer surface 4 which is provided with a corresponding plurality of circumferentially spaced axially extending ball or track grooves 7. A ball retainer cage 10 is located between the outer joint member 5 and the inner joint member 3 and both its inner and outer surface are spherical to be guided upon the spherical surfaces of the inner and outer members. Formed in the cage 10 is a plurality of circumferentially spaced radial openings in which are retained torgue transmitting balls 9 each of which are further received in a pair of opposed ball track grooves 7 and 8 of the outer and inner joint members 5 and 3 respectively.

Figure 3:
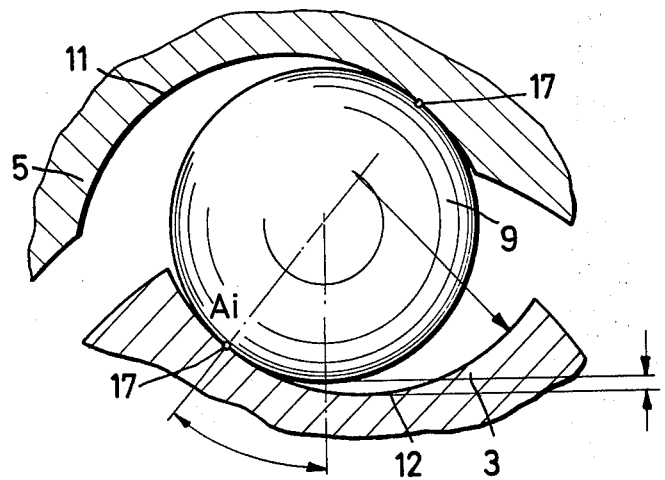
FIGS. 3, 4 and 5 are transverse sectional views in enlarged scale through portions of the outer and inner joint members showing various conventional shapes of the ball grooves and the action of these grooves on the torque transmitting ball therein.

In FIG. 3, the grooves of the outer joint member 5 and the inner jcint 3 are shown in enlarged scale and the engagement of the torque transmitting ball 9 received therein with each of the grooves is also shown. Each of the grooves has a cross-section 11 which is circular and has a radius of curvature greater than that of the ball 9.

Figure 4:
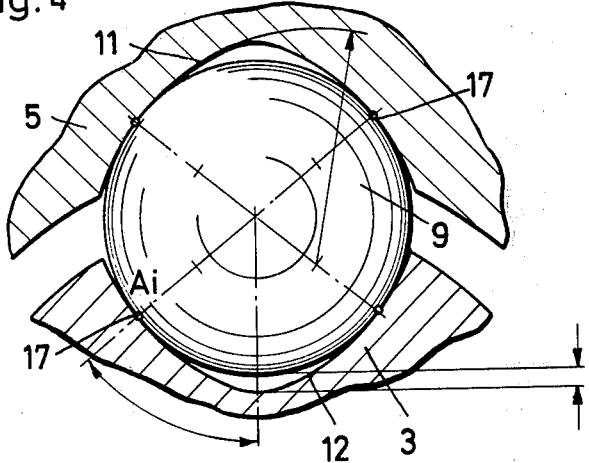
Figure 5:
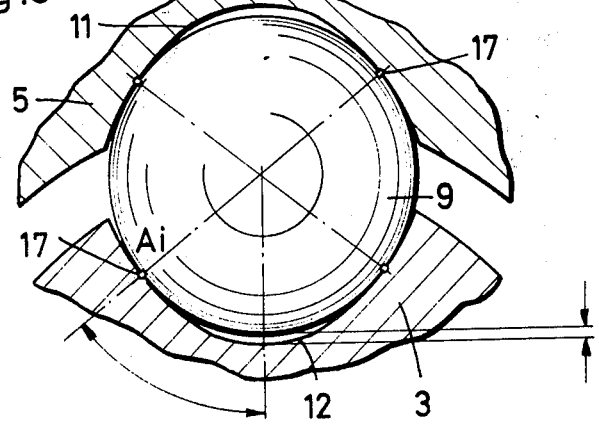

In FIGS. 4 and 5 there are shown other corss-sectional shapes 11 of the ball track grooves. In FIG. 4 the cross-section may be described as gothic in that it consists of two arcs of a circle. In FIG. 5, the corss-section of the groove is eliptical.

Because of the existing radial clearances, during the transmission of torque the balls 9 will make actual contact only with a single point 17 on the surface of the groove in each of the outer and inner joint members.

Figure 6:
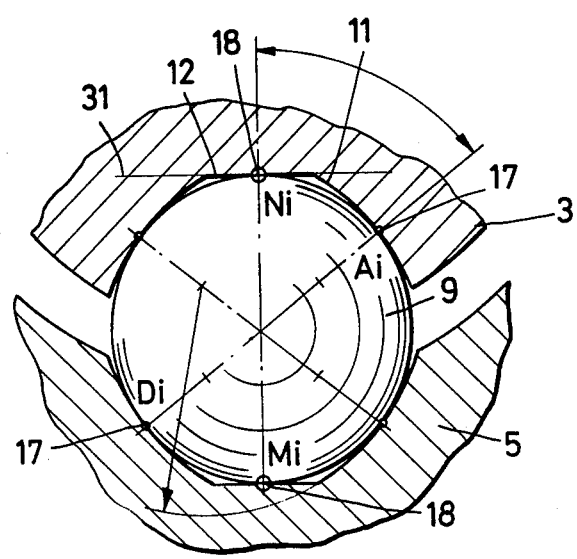

In FIG. 6, the ball track grooves are shaped in accordance with the present invention so as to provide a second point of contact 18 with the ball 9 received within the opposed pair of grooves. This contact point 18 is on the base 12 of the groove. During the transmission of torque, the ball 9 will engage points 17 and 18 of the groove of the outer joint member 5 and, similarly, points 17 and 18 of the inner joint member 3. The base 12 of the groove is formed as a straight line 31. At the points 17, torgue transmission forces and at the points 18, depending upon the angle of rotation of the joint, passive forces are transmitted wholly or partially.

FIGS. 7 and 8 show other forms of the present invention wherein the cross-section of the groove base 12 is in the form of a convex curve 14 as shown in FIG. 7 and in the form of a concave curve 15 in FIG. 8. The radii of curvature of each of the curve bases of FIGS. 7 and 8 are grataer than that of the ball 9.

Figure 9:
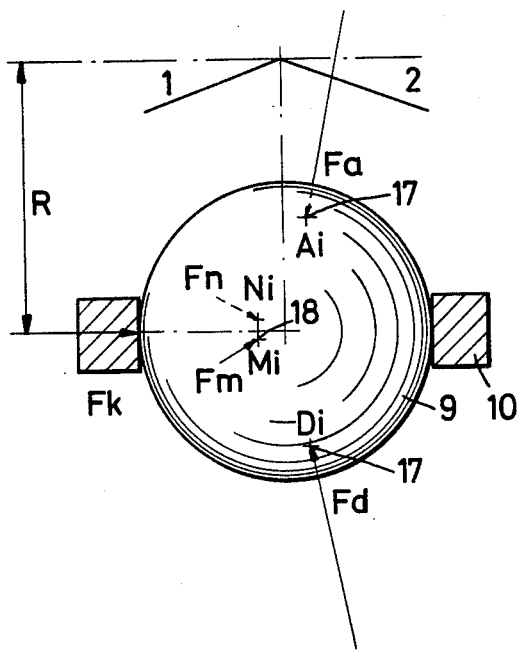
FIG. 9 is a schematic representation of a force diagram showing the forces acting upon a ball supported in a ball groove according to the present invention.

In the diagram of FIG. 9, the ball 9 is shown within the cage 10 and the joint is diagrammatically illustrated as being bent at an angle formed by the shafts 1 and 2. The engagement or application of forces viewed in a spatial relationship. $A_i$ corresponds to contact point 17 of the outer joint member, $D_i$ to contact point 17 of the outer joint member, $N_i$ to the contact point 18 of the inner joint member and $M_i$ to the contact point 18 of the outer joint member. R represents the radius of the movement of the ball 9 and is the distance between the mid-point of the joint to the center of the ball.

The transmission forces $F_a$ of the inner joint member and $F_d$ of the outer joint member are received and somewhat absorbed at points 18 on the base of the ball groove by the passive forces $F_n$ and $F_m$. As a result, the force $F_k$ applied by the cage is less than would be the case without the second contact points 18 on the base of the ball grooves.

Thus, similar to the transmission forces, the passive forces extending through the contact points in the ball grooves of the outer and inner joint members form a certain spatial angle. The resultant passive force opposes the transmission force and thus relieves the cage, at least partially, depending upon the bending angle of the joint, the rotary position of the joint and/or type of the joint.

As a result of the present invention, the operational loads on the cage are significantly reduced as a result the load differences between the individual torque transmitting balls are reduced so that the load is more uniformly distributed between the several torque transmitting balls. The result is a longer and reliable opaeating life for the universal joint as a whole.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint member having a hollow interior and a plurality of grooves in the interior surface thereof, an inner joint member within said outer joint member and having a corresponding plurality of grooves in its outer surface, said inner and outer joint member grooves being opposed from each other to define pairs of opposed grooves, a ball in each pair of opposed grooves contacting a surface of each of said grooves at one point under a torque load, a cage between said joint members having a plurality of radial openings to retain said balls therein, and means in each of said grooves for defining a further contact point for said balls under all bending angles of the joint and under torque load.

2. A constant velocity universal joint as claimed in claim 1 wherein said means comprises a base surface of a groove.

3. A constant velocity universal joint as claimed in claim 2 wherein said groove base surface comprises one of a plane, concave or convex surfaces.

* * * * *